April 26, 1960 A. J. RADCLIFFE, JR 2,934,713
ANODE-FOLLOWER AMPLIFIER
Original Filed Sept. 17, 1954
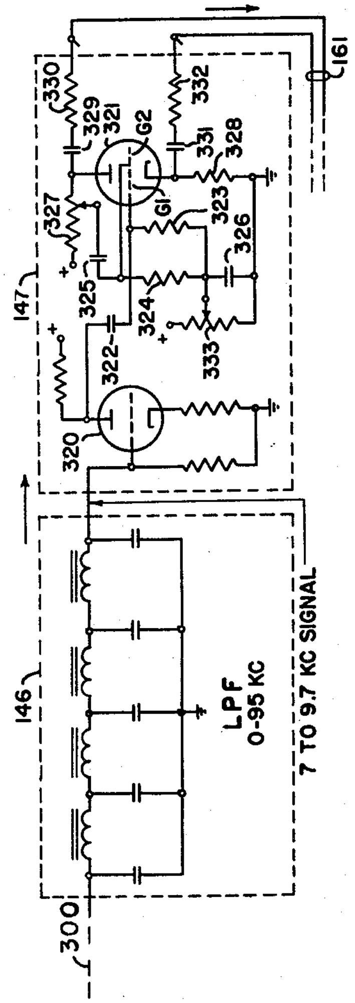

2,934,713

ANODE-FOLLOWER AMPLIFIER

Arthur J. Radcliffe, Jr., La Grange, Ill., assignor to International Telephone and Telegraph Corporation, a corporation of Maryland Original application September 17, 1954, Serial No. 456,730. Divided and this application December 9, 1955, Serial No. 552,144

6 Claims. (Cl. 330—111)

This invention relates to an anode-follower amplifier. Its principal object is to provide an amplifier which supplies an output potential to an anode load which is fixedly related to the input potential on the control grid irrespective of the relationship, within wide limits, between the internal impedance and the impedance of the anode load, being herein termed an anode-follower amplifier.

A further object is to provide an amplifier which is both an anode follower and a cathode follower and supplies the same value of output potential across its anode load as across its cathode load, whereby the respective loads may include the two wires of a balanced-to-ground line and thus render unnecessary the usual line-coupling transformer.

This application is a division of my application for a Multichannel Telephone Carrier System, Serial Number 456,730, filed September 17, 1954, now Patent No. 2,871,293, issued January 27, 1959.

The accompanying drawing illustrated low-pass filter 146 and output amplifier 147, substantially as disclosed in Fig. 3 of the drawings of the parent application.

Referring to the drawing, input signals of frequencies above and below 95 kilocycles reach low-pass filter 146, over signal conductor 300, which rejects all signals above 95 kilocycles and passes the remainder, the important ones of which lie between 7 and 9.7 kilocycles, as is indicated by the label applied to signal conductor extending between filter 146 and amplifier 147, being the signal range over which the output amplifier 147 is to provide uniform amplification and to provide balanced-to-ground overall operation with respect to its output conductor pair 161 which is shown extended to the respective conductors of a transmission line L in the parent application.

The signal from filter 146 is amplified by output amplifier 147, which comprises voltage amplifier 320 and power amplifier 321. The output of 320 is coupled through condenser 322 to grid G1 of power amplifier tube 321, which has its anode connected through resistor 327 to the positive pole of the power supply, and has its cathode connected through the equal resistor 328 to the grounded pole of the power supply. A signal is taken from a slider near the anode end of the resistor 327, through condenser 325, to the second control grid G2 of tube 321. Grids G1 and G2 are connected through resistors 324 and 323 to the slider of biasing resistor 333 to provide both with the same adjusted bias potential. Condenser 326 provides a signal by-pass path to ground. Preferably, the two grids G1 and G2 have equal effects, but if the two grids of a tube selected for use at 321 have unequal effects, the one having the greater effect on the plate current of the tube is used as grid G2, and the slider of resistor 327 is adjusted to compensate for any differences in control provided by the two grids.

A twin triode may be used in place of tube 321, with the plates connected together, the cathodes connected together, and the respective grids used as grid G1 and grid G2. Or a single triode with the one grid serving the functions of both grids G1 and G2 may be used, with an appropriate network for feedback from the plate to the grid. Such a network may consist of a resistance connected between condensers 322 and 325, with a tap near the center of the resistance connected to the grid. However, the illustrated two-grid arrangement (entirely separate grids G1 and G2) are preferred in the same tube 321 or in the described equivalent twin-triode arrangement. These two grids, with their separate grid resistors 323 and 324, constitute means for de-coupling the input path through 322 from the feedback path through 325. This de-coupling is highly desirable to reduce losses inasmuch as the signals in the paths last noted are in phase opposition.

With the grids G1 and G2 biased as shown, an input signal on grid G1 causes the usual impedance variations in the cathode-anode space in tube 321, thereby driving a signal current therethrough by way of equal resistors 327 and 328. With equal loads connected to conductors 161, equal and opposite voltages to ground consequently appear at the anode and at the cathode elements of 321 to supply balanced-to-ground voltages over wires 161 and through junction 184 of the parent application to line L thereof. The signal-voltage drop applied to the cathode of 321 across resistor 328 causes a voltage variation between the cathode and input-signal grid 321 in opposition to the input signal voltage, whereby the cathode-to-ground signal voltage is held to a value no greater than the input signal voltage, as in simple cathode-follower amplifiers. The plate-to-ground signal voltage is thereby held to the same value, but opposite in momentary sign, under the balanced-to-ground load condition assumed.

With the second control grid G2 connected as shown and balanced at the slide of resistor 327 to compensate for any inequality in the control effects of G1 and G2, as described, the signal voltage to ground on the plate of 321 across resistor 327 appears on grid G2 and has a controlling effect on the flow of signal current in 321 which is in phase opposition to the effect exercised by the input signal on G1, whereby the plate-to-ground signal voltage is held to a value no greater than the input signal voltage, as in the case of the cathode-to-ground signal voltage in a simple cathode-follower amplifier. Thus, both of the grids G1 and G2 act degeneratively to the same end—that the signal voltage to ground of the associated electrode (cathode for G1, anode for G2) does not exceed the applied input signal voltage on G1. Conversely, equal currents supplied externally to output conductors 161 cause equal voltages to ground to appear thereon, for the plate-associated output wire then finds the same load to ground at 321 and 327 as is offered to the other output wire at 321 and 328. In each case, the externally applied voltage causes the same degree of control-grid action to occur to influence current-flow through tube 321.

By the foregoing fully balanced-to-ground arrangements at 147, a number of similar output amplifiers 147 may be connected in parallel as disclosed in the parent application and as indicated to the right of 147 by conventional multiple signs, or the line L thereof may be subjected to external interference applied equally to its two conductors, without upsetting the desired balanced-to-ground condition of 161 or of the said line L.

Output from the tube is taken through the condenser 329 and resistor 330 from the anode side, and through condenser 331 and resistor 332 from the cathode side. The output is connected to path 161 in multiple with the output from similar amplifiers for transmitting sections T2 to T9. Resistors 330 and 332 are of a value such that the series impedance through resistor 330, condenser 329, tube 321, condenser 331, and resistor 332 approximately equals the impedance of path 161.

Where not needed, as for impedance matching purposes, resistors 330 and 332 may be omitted, as is illustrated in the parent application for the similar amplifier 447 not herein illustrated.

I claim:

1. An output amplifier including vacuum-tube means having an anode, a cathode, and interposed control-grid means, means providing a cathode-anode circuit path for passing direct current through the cathode and anode in series from a power supply, a point in said circuit path external to said vacuum-tube means comprising a point of reference potential, means providing a grid-bias circuit path leading to the grid means from said point of reference potential and serving to maintain the grid means at a negative D.C. potential with respect to that of the cathode, means coupling a source of input signals to the grid means, an anode impedance element connected serially in said cathode-anode circuit path between the said point of reference potential and said anode, an output signal conductor and means coupling it to the anode to receive signals according to signal voltage developed across the said impedance element, means providing a feedback circuit path from the anode to the grid means through a D.C. blocking condenser of sufficient capacity that there is no substantial signal-voltage drop across such condenser at any frequency within the frequency range of input signals to be amplified, the remaining portion of the feedback circuit path being sufficiently non-reactive over the said frequency range that all signals within the said frequency range reaching the grid means over the feedback path are in phase with the output signal voltage across the said impedance element and are consequently in phase opposition to the signals reaching the control-grid means from the source of input signals, and means included in the foregoing structure for substantially decoupling the feedback circuit path from the path over which input signals reach the grid means.

2. In an amplifier according to claim 1, the said grid means comprising a first control grid and a similar second control grid, with the input signals and the anode signals being directed respectively thereto by the said coupling and feedback means.

3. An amplifier according to claim 2, wherein the said feedback means coupling the anode to the grid means includes a tap connection from the said anode impedance element for supplying a selected fraction of the anode signal potential to the said second control grid inversely according to desired gain in anode signal potential over the input signal potential.

4. In an amplifier according to claim 1, wherein the said point of reference potential is grounded, a two-wire balanced-to-ground transmission line, the said output signal conductor being one conductor of the line, a cathode impedance element of equal magnitude to that of the said anode impedance element connected in the circuit path between the grounded point and the said cathode of the amplifier, and a further output means coupling the other conductor of the line to the said cathode.

5. In an amplifier according to claim 4, the said grid means comprising a first control grid and a similar second control grid, with the input signals and the anode signals being directed respectively thereto by the said coupling and feedback means.

6. An amplifier according to claim 5, wherein the said feedback means coupling the anode to the grid means includes a tap connection from the said anode impedance element for supplying a fraction of the anode signal potential to the said second control grid to set the value of output signal potential from the said anode to be substantially equal to the output signal potential from the said cathode.

References Cited in the file of this patent

UNITED STATES PATENTS

| | | |
|---|---|---|
| 2,109,760 | Urtel | Mar. 1, 1938 |
| 2,416,334 | Levy | Feb. 25, 1947 |
| 2,429,124 | Cunningham | Oct. 14, 1947 |
| 2,480,163 | Romander | Aug. 30, 1949 |
| 2,510,683 | Carpentier | June 6, 1950 |
| 2,527,535 | Emmett | Oct. 31, 1950 |
| 2,573,523 | Watters | Oct. 30, 1951 |
| 2,584,386 | Hare | Feb. 5, 1952 |
| 2,623,996 | Gray | Dec. 30, 1952 |
| 2,762,965 | Walker | Sept. 11, 1956 |